May 11, 1948. H. E. McCORDIC 2,441,161
GAS GENERATOR FOR COMBUSTIBLE FARM WASTES
Filed April 27, 1945 2 Sheets-Sheet 1
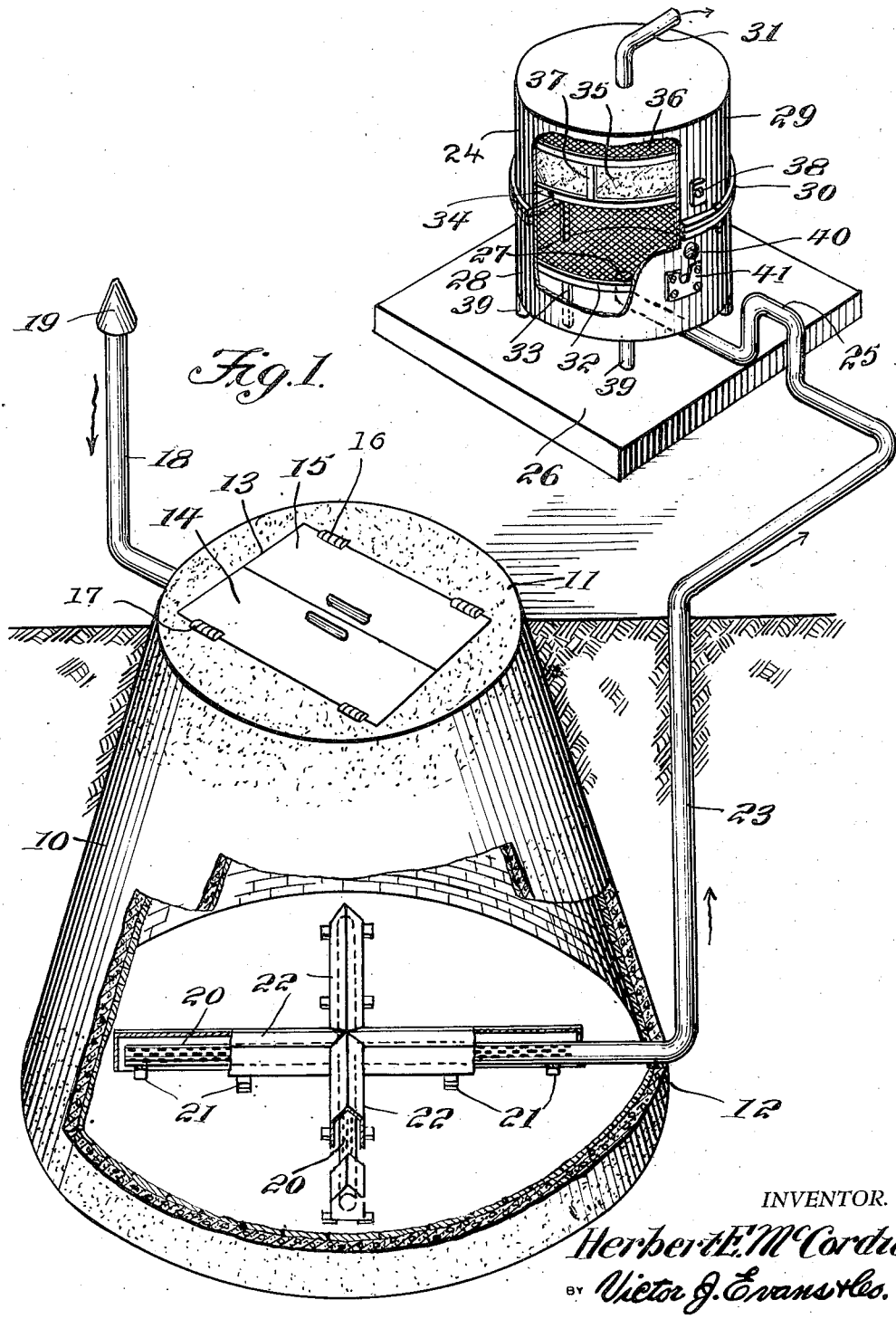
INVENTOR.
Herbert E. McCordic,
BY Victor J. Evans & Co.
ATTORNEYS May 11, 1948. H. E. McCORDIC 2,441,161
GAS GENERATOR FOR COMBUSTIBLE FARM WASTES
Filed April 27, 1945 2 Sheets-Sheet 2
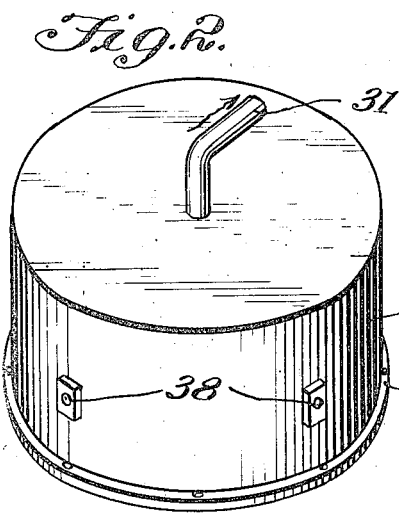
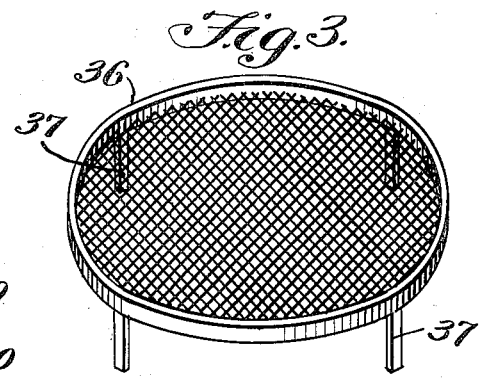
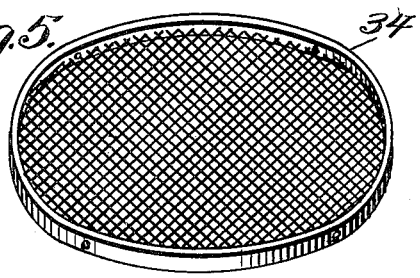
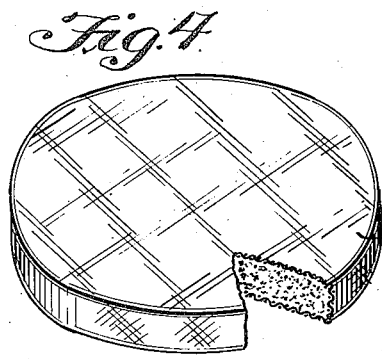
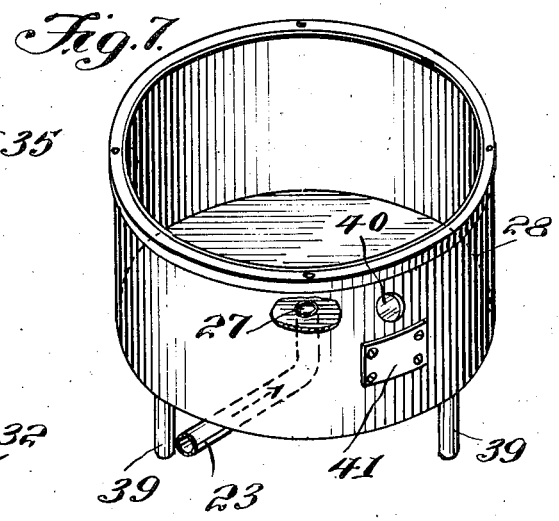
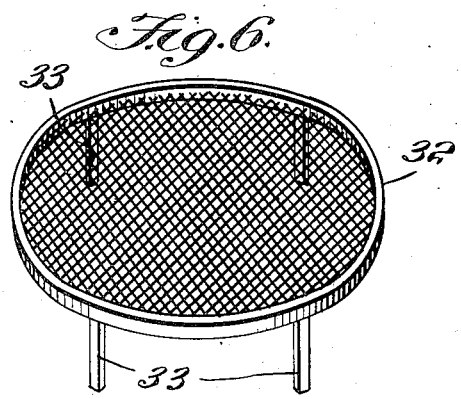
INVENTOR.
Herbert E. McCordic,
BY Victor J. Evans & Co.
ATTORNEYS Patented May 11, 1948

2,441,161

UNITED STATES PATENT OFFICE 2,441,161

GAS GENERATOR FOR COMBUSTIBLE FARM WASTES

Herbert E. McCordic, Groton, S. Dak.

Application April 27, 1945, Serial No. 590,583

3 Claims. (Cl. 48—76)

This invention relates to gas producers of the type adapted for the utilization of waste materials particularly such as by-products of farms, as straw, weeds, corn cobs, or wood waste products such as sawdust, chips, or slab wood, and in particular the invention refers to a large conical shaped cupola buried in the ground and provided with an intake opening having a closure, a down draft connection communicating with the upper end, a shielded gas take-off connection communicating with the lower end, a scrubbing tank or filter, and means for drawing gases from the lower end of the cupola through the scrubbing tank or filter.

The purpose of this invention is to provide means for reducing normally waste by-products and particularly vegetable products and waste materials of farms and the like to a gas suitable for domestic use such as heating, cooking, and the like, and which either by itself or in combination with other gases, may be used as fuel in heating plants or in internal combustion engines.

Gases generated from vegetable materials, like gases produced from wood products have a relatively high flash point and for this reason may be used with comparative safety. Gases produced from vegetable products carry a relatively small volatile tar content, however, this may be neutralized by introducing a comparatively small amount of clean tarless natural gas.

The object of this invention is therefore, not only the utilization of normally waste materials, but also the provision of an economical gas fuel particularly for farm use, which may be used for heating and cooking, and also for operating farm equipment and machinery.

Another object of the invention is to provide means for converting vegetable waste materials into a useful gaseous product which is comparatively simple and inexpensive to operate.

A further object of the invention is to provide a gas producer for recovering useful gas from normally waste products which is of comparatively simple and economical construction.

With these and other objects in view the invention embodies a relatively large chamber in the shape of a truncated cone with an opening in the upper end adapted to receive several tons of waste material such as straw or weeds from a truck or trailer, doors adapted to close said opening, a tubular air inlet connection communicating with the upper end and extending upward therefrom, a perforated tubular member with a protecting shield in the lower end of said chamber, a scrubbing tank or filter, and suitable connections from the perforated tubular member to the tank or filter and from the tank or filter to a pump or suction means.

For other objects and for a better understanding of the invention, reference may be had to the following detailed description taken in connection with the drawings, in which Figure 1 is a view illustrating the relative positions of the cupola, filter, and inlet and outlet connections, with parts broken away.

Figure 2 is a view showing the upper part of the filter casing.

Figure 3 is a detail showing the upper screen of the filter.

Figure 4 is a detail illustrating a filtering element used in combination with the screens.

Figure 5 is a detail showing an intermediate screen of the filter.

Figure 6 is a detail showing the lower filter screen.

Figure 7 is a view showing the lower section of the filter casing.

Referring now to the drawings wherein like reference characters indicate corresponding parts the gas producer of this invention includes a cupola 10 which is in the shape of a truncated cone with a smaller upper end 11 and a relatively large lower end 12. The upper end is provided with an opening 13 having doors 14 and 15 attached by hinges 16 and 17, and communicating with the interior of the upper end is a tubular connection 18, having a cover 19. Air is supplied to products burning in the cupola through the connection 18 as indicated by the arrow.

The cupola 10 is preferably made of concrete with a fireclay or firebrick lining, and as an illustration, it may be about twenty feet deep, and twenty-four feet in diameter at the lower end and eight feet in diameter at the upper end. The cupola may, however, be of any other size or shape than that shown and described.

In the lower end of the cupola is a spider formed of perforated pipes 20 which are supported on legs 21 and protected by shields 22 that are spaced from the pipes as shown. The shields are open at the bottom so that gases from materials on the base of the cupola may be drawn into the pipes 20 and carried upward through a conduit or connection 23 to a filter 24. The connection 23 is formed with a U-bend or trap 25 to prevent fluids from the lower part of the filter passing down through the connection to the cupola. The connection 23 may be connected directly to a pump or other means for providing suction therein or it may be connected to the pump or suction device through the filter as shown.

In the design shown the cupola is positioned below the surface of the ground and the filter is located on a slab 26 with the upper end of the connection 23 entering the filter through an opening 27 in the lower section 28 thereof. The filter is formed in two sections with an upper section 29 attached to the lower section through a rim 30, and the upper section is provided with an outlet connection 31 by which it may be connected to a pump or other means for providing suction. The lower section 28 is adapted to hold water and a lower section 32 having legs 33 is positioned therein. An intermediate screen 34 is positioned above the rim 30 and a filtering element 35, of sawdust or the like may be carried by the screen 34. An upper screen 36 with supporting arms 37 may be used above the filtering element, and it will be understood that as many screens or filtering elements as may be desired may be used in the filter. The upper section is provided with bolt openings 38 through which the screen 34 in the upper section may be held, and the lower section, which is supported on legs 39, is provided with a peep hole 40 and a clean cut opening which is normally sealed by a plate 41, through which tar and other accumulations on the water in the base of the filter may be removed.

With constant suction through the connection 23 the volatile gases such as carbon monoxide will be drawn from the burning or partly burned materials with the cool, heavier air at atmospheric pressure passing downward through the connection 18. The gases withdrawn through the connection 23 may be washed and filtered and then stored until used, and these gases may be used independently or combined with natural or other gas or gases as may be desired.

The waste materials may also be burned independently or these may be mixed or combined with other combustible materials in the cupola to facilitate burning. Steam, compressed air, or other substances or materials may also be introduced into the cupola to accelerate burning or combustion.

It will be understood that other modifications may be made in the process or design or arrangement of the parts without departing from the spirit of the invention.

What I claim as my invention and desire to be secured by Letters Patent is:

1. In a down draft gas producing furnace, a relatively large chamber in the shape of a truncated cone with an inlet opening in the smaller upper end, doors hinged to the upper end of the chamber providing a closure for the opening therein, a tubular inlet connection extending upward from a point adjacent the upper end of the chamber, a spider with perforated tubular arms spaced from the lower end of said chamber, jackets surrounding said tubular arms and spaced therefrom, a scrubbing tank positioned at a remote point, a conduit extending from said spider to said scrubbing tank, and an outlet connection extending from said scrubbing tank.

2. In a down draft gas producer, a cupola in the shape of a truncated cone with an inlet opening in the smaller upper end, a closure for said inlet opening, an air inlet connection extending upward from a point adjacent the upper end of the cupola, a perforated tubular element spaced from the lower end of said cupola, a protecting jacket surrounding said tubular element, a scrubbing tank positioned at a remote point having a water chamber therein, spaced screen trays horizontally positioned in said scrubbing tank, a layer of filtering material positioned in one of said trays, a conduit extending from said perforated tubular element to a point of said scrubbing tank below the water line thereof, and an outlet connection in the upper end of said scrubbing tank.

3. A down draft gas producer comprising a cupola having the shape of a truncated cone, an air inlet conduit communicating with the upper end of the cupola, a perforated gas collection conduit spaced from the base of said cupola, a gable shaped trough disposed so as to cover said perforated collection conduit and spaced therefrom providing an open area between the conduit and trough, the lower end of said trough being open and spaced from the lower end of the cupola, and an outlet conduit communicating with said collection conduit and extending to a remote point outside of the cupola, said outlet conduit providing suction means through which gases may be exhausted from the cupola.

H. E. McCORDIC.

REFERENCES CITED

The following references are of record in the file of this patent:

UNITED STATES PATENTS

| Number | Name | Date |
|---|---|---|
| 2,168,652 | McDonald | Aug. 8, 1939 |
| 2,204,902 | McDonald | June 18, 1940 |
| 1,565,933 | Harris | Dec. 15, 1925 |

FOREIGN PATENTS

| Number | Country | Date |
|---|---|---|
| 457,959 | Great Britain | Dec. 9, 1936 |